J. KARR.
Chronometer Escapement.
No. 44,317.
Patented Sept. 20, 1864.
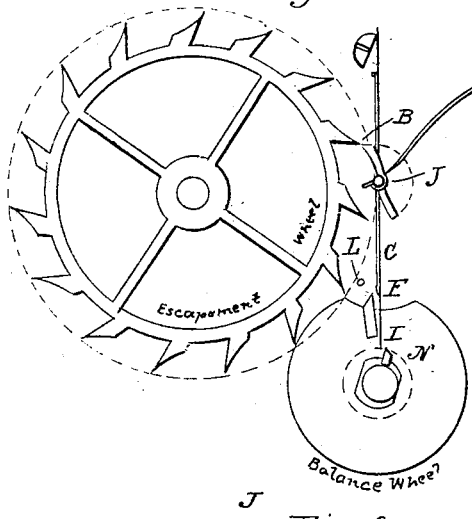
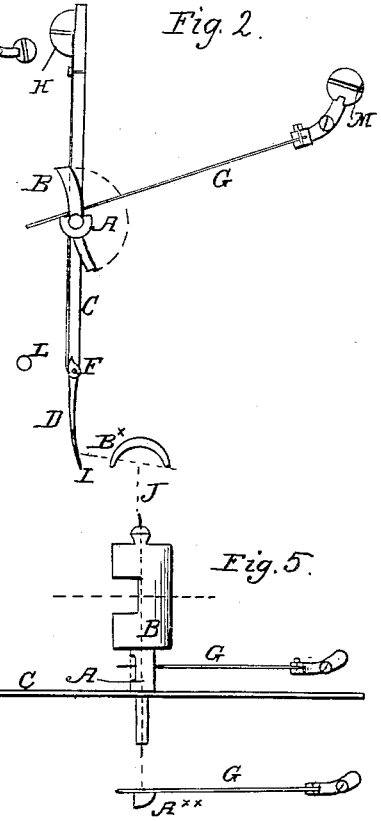
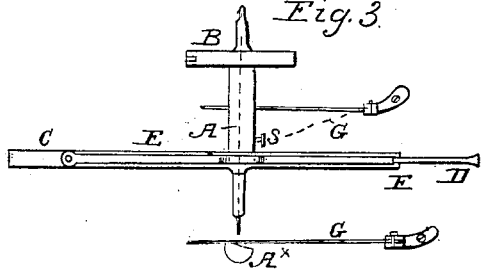
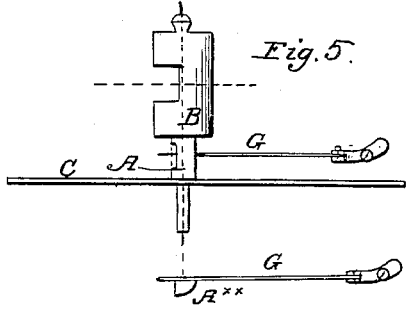
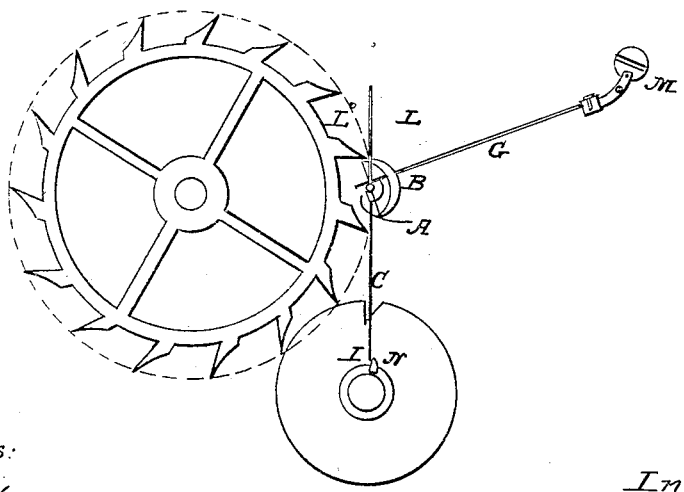
Witnesses:
Inventor:
J. Karr

UNITED STATES PATENT OFFICE.

JACOB KARR, OF WASHINGTON, DISTRICT OF COLUMBIA.

IMPROVEMENT IN ESCAPEMENTS FOR CHRONOMETERS.

Specification forming part of Letters Patent No. 44,317, dated September 20, 1864; antedated September 1, 1864.

*To all whom it may concern:*

Be it known that I, JACOB KARR, of Washington city, District of Columbia, have invented a new Improvement in Escapements for Chronometers; and I do hereby declare that the following is a full and exact description thereof, reference being had to the annexed drawings, making a part of this specification, and the letters of reference marked thereon, which designate the same parts in each figure, respectively.

The nature of my invention consists in constructing an escapement-lever suitable for chronometer purposes which requires less power to obtain a necessary motion to lock and unlock the escapement-wheel of a chronometer, has less friction to overcome, is more compact, more durable, can be made for less money, and is less liable to get out of repair in accomplishing the object of making time accurately than any chronometer-escapement known to me.

In order that others skilled in the art may understand its formation and operation and be enabled to make and use my invention, I will proceed to describe its peculiar construction.

I construct my chronometer escapement-lever out of any suitable materials used by watch-makers for similar purposes, and of any suitable size in form of Fig. 3 and its equivalent Fig. 5, and which invention is further illustrated in its form and in its application in Figs. 1, 2, and 4, the parts of which are designated, viz:

A is the upright staff or cylinder, with its pallet-point B. C is the simple lever or fork. D is the short lever, with its spring E and its joint F. G is the lock-spring, with its regulating-screw M. L is the safety-screw. H and S are resting-screws, all of which combined, as shown in appropriate positions in Figs. 1 and 4, and also in Figs. 2, 3, and 5, form what I call my "escapement-lever."

As further distinguishing terms, I will call the pallet-point B the lock end of the lever, and the other end, I, the power end of the lever, and the center J of the staff or cylinder A the fulcrum. The position of the fulcrum J is one-fifth the length of the true lever (from I to B) from the lock end B of the lever. The power of motion is applied to the lever at I, the center of motion is at J, and the resistance to be overcome is at B.

I will now describe the relative position of the lever to the other works of the chronometer, Figs. 1 and 4, the manner in which it works, with the different motions it makes in producing the result of escapement, as is shown in Fig. 1 and its equivalent Fig. 4, referring first to Fig. 1. I place the escapement-lever on the front of or beyond the line of the extreme radius of the escapement-wheel, bringing the center J as near to the teeth of the wheel as the staff or cylinder will allow without interfering with the teeth of the wheel, so that the pallet B may come far enough within the line as to receive squarely (in no case at an angle) the teeth of the wheel in its stroke— that is to say, in such position that the spring G, pressing upon an angle of the staff or the screws in the staff, will return the pallet-point B to a lock position each and every time it is unlocked by the action of the balance through its pallet N on the end of the lever at I. The manner in which the spring G presses on an angle of the staff, giving it the power to hold the lever in its lock position, is shown at A×, Fig. 3. This spring G can also be made to press upon the screw S for the same effect. The fork C as it extends past the staff A, Fig. 1, rests against the screw H during the time of the lock of the escapement-wheel, and leaves it only during the instant of the unlocking process. The position of the escapement-lever is such that it fully receives the power of the balance through its pallet point N, which action of the balance in its motion from right to left and from left to right has two distinct effects on the escapement lever, the one motion moving the whole lever to the left, which unlocks the escapement-wheel, at which time the short lever is stiff in its joint, and moves as a part of and with, and fully dependent on, the whole lever, the other motion moving the short lever D on its axis F to the right. The adjusting motion of the spring E to the short lever D is very slight, and brings the lever to its straight position immediately after the power of the balance pallet N has ceased to act upon it, impelling it in its independent motion to the right. The result of the left stroke of the balance-wheel through its pallet-point N striking the escapement-lever at its power end I is to unlock or throw back the pallet-point B, allowing the escapement-wheel to go free. Now, before the coming tooth of the escapement-wheel has traversed not quite half of the distance between its teeth, the spring G has pressed the lever to its lock position, ready to receive the coming tooth squarely upon the pallet-point B.

The effect of the return motion, or the motion of the balance to the right, is to place the pallet-point N in the position to affect the unlocking-stroke, or stroke to the left, and so lightly does it strike the lever D in this motion to the right, and for the further reason that the lever D is moved to the right on its axis F, to allow the pallet-point N of the balance to pass, that the rest of the pallet B is not disturbed in the least in its perfect lock of the escapement-wheel where it is held by the power of the spring G; and the jointed lever D, immediately after the passage of the pallet-point N, is adjusted by the spring E, and is ready again to receive the blow of the pallet-point N in its motion to the left, which unlocks the escapement-wheel.

Having reference to Fig. 4, which I consider equivalent to Fig. 1, it will be seen that the short lever D and its spring E and the resting-screw H are dispensed with, and that the action of the balance is directly upon the simple lever C, whose fulcrum is the center, J, of the cylinder or upright A. The balance in its left stroke unlocks the escapement-wheel, as in Fig. 1, as before described. In its return stroke the pallet-point N strikes the end of the lever with only about one-sixth the power that it strikes it in its forward motion to the left. This pallet-point is so shaped and so set on the balance that in the forward motion it strikes the lever squarely and with more surface than in the return motion, when it presents an angular surface, which strikes a glancing stroke. The result of this stroke on the lever is to drive the lock-point B a very little farther upon or into the teeth of the escapement-wheel, but the instant the effect of the return stroke subsides the power of the spring G forces back the escapement-lever to its original lock position, and the lever is again ready for the forward or unlocking stroke. The position of the spring G in its rest against the cylinder is seen at $A^{\times\times}$, Fig. 5.

$B^{\times}$ represents an end view of the cylinder.

What I claim as my invention, and desire to secure by Letters Patent, is—

The construction of an escapement-lever, as is shown in Figs. 1, 2, 3, 4, and 5, in its combination, as designated by the letters A, B, C, D, E, F, G, H, L, M, and S, for the uses and purposes herein described.

J. KARR.

Witnesses:
W. D. WOOD,
A. DE WITZLEBEN.